United States Patent
Ochi

(10) Patent No.: US 6,739,876 B2
(45) Date of Patent: May 25, 2004

(54) EDUCATIONAL PLAY APPARATUS AND SYSTEM

(76) Inventor: Yasushi Ochi, c/o Oriental Sangyo, Ltd., 1-5, Hiranouemachi 1-Chome, Hirano-ku, Osaka, Osaka-fu 547-0045 (JP)

( * ) Notice: Subject to any disclaimer, the term of this patent is extended or adjusted under 35 U.S.C. 154(b) by 0 days.

(21) Appl. No.: 10/063,912

(22) Filed: May 23, 2002

(65) Prior Publication Data

US 2002/0168617 A1 Nov. 14, 2002

Related U.S. Application Data

(63) Continuation of application No. PCT/JP00/08192, filed on Nov. 20, 2000.

(30) Foreign Application Priority Data

Nov. 24, 1999 (JP) .......................................... 11-332288

(51) Int. Cl.⁷ .............................................. A63B 17/00
(52) U.S. Cl. ........................ 434/258; 482/35; 434/365
(58) Field of Search ........................... 482/35; 273/146, 273/394, 395; 446/220; 434/167, 169, 156, 365; 472/136, 137, 92; 437/258, 247

(56) References Cited

U.S. PATENT DOCUMENTS

| | | | | |
|---|---|---|---|---|
| 2,219,154 A | * | 10/1940 | Wahlberg | 273/146 |
| 2,645,486 A | * | 7/1953 | Monahan | 273/294 |
| 3,655,197 A | * | 4/1972 | Milbaum | 273/146 |
| 5,226,864 A | * | 7/1993 | Showers | 482/35 |
| 5,320,887 A | * | 6/1994 | Moss et al. | 428/35.7 |
| 5,522,757 A | * | 6/1996 | Ostrowski | 446/220 |
| D382,618 S | * | 8/1997 | Gift | D21/240 |
| 5,673,918 A | * | 10/1997 | Bigari | 273/395 |
| 5,853,332 A | * | 12/1998 | Briggs | 472/128 |
| 5,865,680 A | * | 2/1999 | Briggs | 472/128 |
| 5,891,000 A | * | 4/1999 | Phillips | 482/49 |
| 6,093,134 A | * | 7/2000 | Worsham | 482/35 |
| 6,174,242 B1 | * | 1/2001 | Briggs et al. | 472/136 |
| 6,231,451 B1 | * | 5/2001 | Briggs | 472/128 |

FOREIGN PATENT DOCUMENTS

| | | | |
|---|---|---|---|
| JP | 52-127567 U | 9/1977 | |
| JP | 61-190576 U | 11/1986 | |
| JP | 01281938 A | * 11/1989 | ........... B41F/16/00 |
| JP | 6-17508 Y2 | 5/1994 | |
| JP | 10-66785 A | 3/1998 | |
| JP | 2729364 B2 | 3/1998 | |

OTHER PUBLICATIONS

Mitsuaki Shimada, "Event you Multi–Screen System", "Interface, vol. 23, No. 7", Jul. 1, 1997, pp. 68–71, CQ Shuppan K.K., Japan.

* cited by examiner

*Primary Examiner*—Teresa Walberg
*Assistant Examiner*—Kathleen Christman
(74) *Attorney, Agent, or Firm*—James Judge

(57) ABSTRACT

Educational play apparatus and system that enables preschool and primary education to be conducted while play is taking place, and that is equipped, by a plurality of gas globes (30) being housed within a play space (S) screened-off with a screen-off member (15), so that players (Y) may have fun capturing the gas globes (30) within the play space (S), wherein educational information is displayed on the surface of the gas globes (30). The players (Y) come into contact spontaneously with the educational information in the midst of playing games, reinforcing information given them up to that point through care workers, as well as imparting information to them while playing together with care workers, which serves naturally to improve knowledge acquirement and scholastic ability.

13 Claims, 8 Drawing Sheets

FIG. 3
(a) 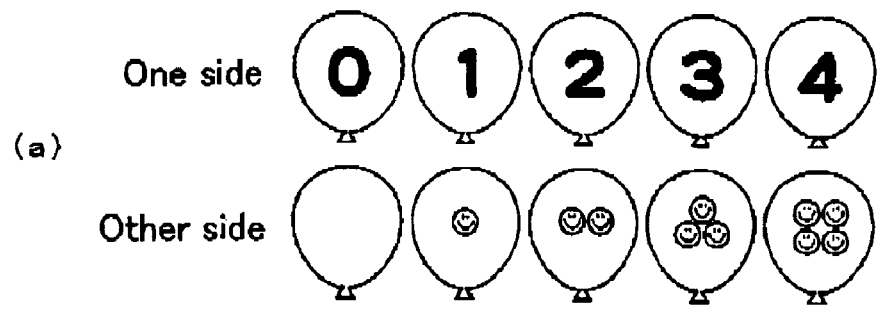
(b) 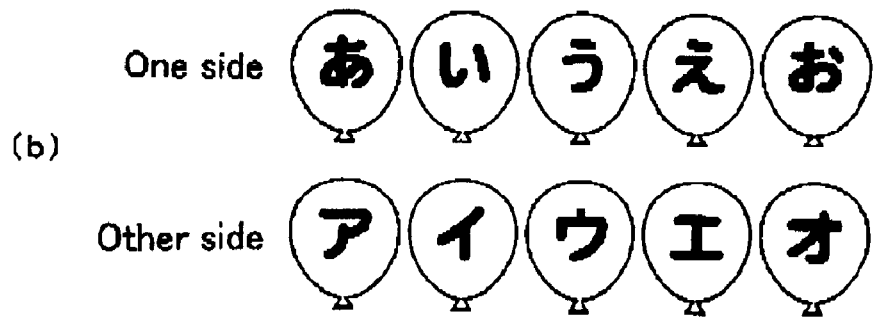
(c) 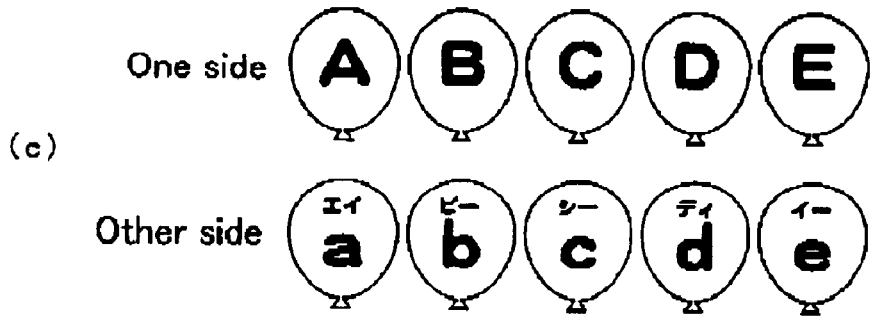

FIG. 4
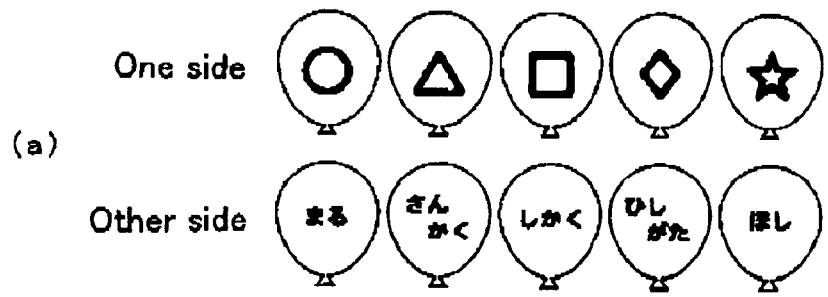
(a)
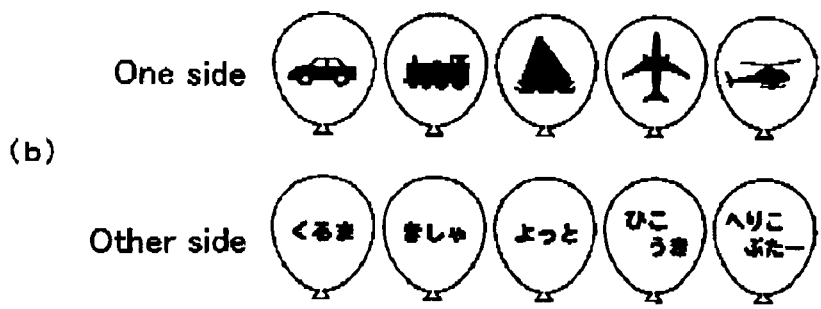
(b)
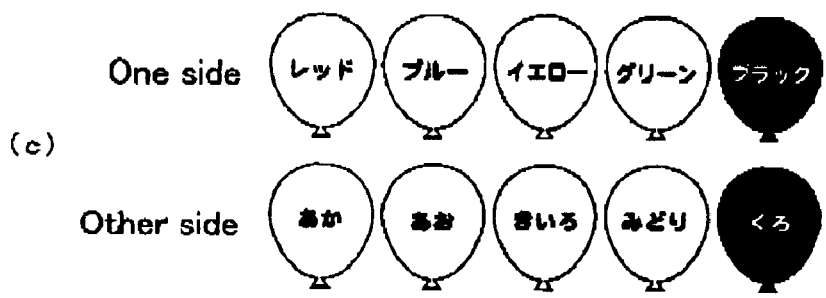
(c)
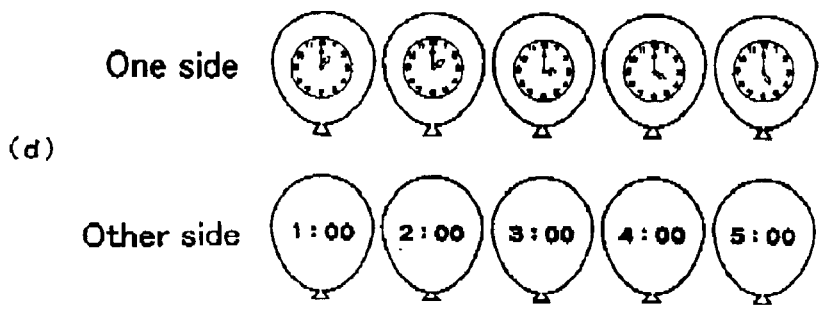
(d)

EDUCATIONAL PLAY APPARATUS AND SYSTEM

CROSS REFERENCE TO RELATED APPLICATIONS

This is a continuation of International Application PCT/JP00/08192, with an international filing date of Nov. 20, 2000, published in Japanese (not in English) under PCT Article 21(2) and now abandoned.

BACKGROUND OF INVENTION

1. Technical Field

The present invention is a play apparatus housing a number of gas globes within a play space and equipped so that players may have fun capturing the gas globes, and relates to an educational play apparatus and system rendered so that players can receive preschool and primary education and while playing.

2. Background Art

As a play apparatus housing a number of gas globes within a play space and equipped so that players may have fun capturing the gas globes, the present inventor has proposed the play apparatus disclosed previously in Japanese Pub. Pat. App. No. H08-126769. This play apparatus is made up of: support posts stood in four places; a screen-off member consisting of a net-like material stretched across the support posts; a cover sheet provided along the hem part of the screen-off member; balloons accommodated within the space enclosed by the screen-off member; and electric fans installed at the top-end portions of the support posts.

By means of this play apparatus, air currents heading from the vicinity of the upper rim of the play space toward the bottom are set up by the fans, and the air currents are changed in flow direction by the bottom of the play space and by the cover sheet, becoming a swirling current that returns to the interior of the play space; the balloons provided within the play space are stirred up by the swirling current, and float and flutter about. This then lets small children who are players enjoy all sorts of games within the space in which the balloons are in this way borne aloft and dancing about, such as playing at capturing the balloons.

In this regard, although the importance of preschool and primary education is generally recognized, in the past the equipment for carrying such instruction out has for the most part been tools and materials that, in the form of picture-books and puzzles, are used on a desktop; there have been no tools and materials at all that enable educating while playing outdoors. For human beings fundamentally, movement of the four limbs, i.e. exercise, serves to stimulate the brain, and getting information in such a state serves to improve knowledge and scholastic ability. Likewise, implementing instruction while they are playing lets young children learn while their interest is held and they enjoy themselves, and improves the effectiveness with which the learning is acquired. Moreover, by learning under an environment in which a crowd is playing, commitments to and relationships with others are recognized, allowing practice in striving to make one's intentions understood, as well fostering cooperativeness.

SUMMARY OF INVENTION

The present invention was prompted by the above-described current situation, with the object being provision of an educational play apparatus and system that enables preschool and primary education and while playing.

The present invention is a play apparatus with a plurality of gas globes being housed in a play space screened-off into a compartment and equipped so that players may have fun capturing the gas globes within the play space, and has to do with an educational play apparatus characterized in that educational information is displayed on the surface of the gas globes.

Educational information set out by the invention is information needed chiefly for preschool and primary education; to cite an example of this, if for instance the color of a gas globe is black, text that means this—"くろ" (Japanese signifying black), "クロ" (Japanese signifying black), "ぼし" (Japanese signifying black), and "BLACK" (English signifying black)—and information that is their correlates would be applicable; and if the contour of a gas globe is star-shaped, text that means this—"ほし" (Japanese signifying star), "ホシ" (Japanese signifying star), "スター" (Japanese signifying star), and "STAR" (English signifying star)—and information that is their correlates would be applicable.

Young children who play games in the play space capturing gas globes on which educational information like that noted above is displayed come into contact spontaneously with aforementioned educational information in the midst of playing games, reinforcing information given them up to that point through care workers, as well as imparting information to them while playing together with care workers, such that they come naturally to comprehend the informational content of text like the aforementioned.

As described above, for human beings exercise serves to stimulate the brain, and getting information under such circumstances serves to improve knowledge and scholastic ability; likewise, implementing instruction while they are playing lets young children learn while their interest is held and they enjoy themselves, and improves the effectiveness with which the learning is acquired. Further, by learning under an environment in which a crowd is playing commitments to and relationships with others are recognized, allowing practice in striving to make one's intentions understood, as well as fostering cooperativeness. Through the present invention, that fact that preschool and primary instruction may be carried out while playing games serves to improve knowledge and scholastic ability and to improve acquirement effectiveness, and demonstrates effectiveness in allowing cooperativeness to be fostered from the toddler stage.

Here, the aforesaid gas globes include all sorts, such as rubber balloons, rubber balls, hollow balls formed from hard plastic or soft plastic, and vinyl sheets made into the form of bags and blown up by charging them with a pressurized gas; furthermore their shapes, not limited to being spherical, may be lent all sorts of contours, such as stellate, rhombic and cubic.

The expressing of educational information on the gas globes is preferably by sectioning the surface of the gas globes into a number of display regions, such that educational information may be displayed in each display region. Doing so lets even more educational information be displayed using a single gas globe, and allows having young children master even more knowledge.

Likewise, the educational information displayed in each display region can be rendered so as to have an item from at least one set or more that includes the information, i.e., has interrelatedness. For example, the pair of related items "レッド" (Japanese signifying red) and "あか" (Japanese signifying red) are displayed on a gas globe. Doing so allows having youngsters master with ease knowledge of the correlation between like characters.

With regard to the aforementioned capturing game, teachers at a kindergarten for example can lead the game by giving out instructions. To give a specific example, if the figure of an airplane and the letters "ひこうき" (Japanese signifying airplane) are displayed on balloons (gas globes), a teacher may give out the instruction "Please get an airplane balloon" to have toddlers play at picking out, from among the numerous balloons there are, balloons on which an airplane figure is displayed and balloons on which "ひこうき" (Japanese signifying airplane) is written. Then for this sort of play, furnishing storage means that stores the gas globes that the players have captured enables, for example, organizing teams formed of several persons and letting them play games that make them collaborate and make commitments as a team in having them store captured balloons in the storage means, which enables fostering in youngsters the cooperativeness that accompanies teamwork.

Further, the educational information may be portrayed on the gas globes by displaying the educational information directly on the gas globes through printing or else another method; however, the educational information may be displayed on the gas globes indirectly by utilizing films on which the educational information is represented and applying them onto the gas globes. While on the one hand with some gas globes, such as for example balls made of hard plastic or soft plastic, printing onto their surfaces is difficult to implement or otherwise the printing costs are expensive, printing onto films, which is relatively simple and low cost, will do. Accordingly, simple, low-cost portrayal of educational information can be carried out in the manner noted above.

Thus if the gas globes are to be formed by inflating, through the sealed introduction of a pressurized fluid, bags made from a gastight elastic material, as with rubber balloons, the film can be made to cover over a gas globe by constituting the film from a material lent extensibility and forming it into bag-like or tubular shapes, and, after inserting a bag made from the gastight elastic material into the film formed bag-like or tubular, by the sealed introduction of a pressurized fluid therein to get the bag made of the gastight material to inflate together with the film.

If on the one hand the gas globes are formed from a hard plastic to have good shape retentiveness, the film may be constituted from a material lent heat-shrinking properties and formed into a bag-like or tubular shape, and the film may be cover-wrapped onto a gas globe by inserting the gas globe into the film formed bag-like or tubular and thereafter subjecting it to a heating process to get the film to shrink.

Further, educational information portrayal may be displaying it on a gas globe by pasting onto the gas globe a thin film material (e.g., a sticker or the like) on one side of which an adhesive such as a bonding agent is spread and on the opposite side of which educational information is represented. Representing educational information on the thin film may be by printing, and for letters/characters and shapes may be by punching out their contours.

The capturing game may be led in accordance with game progress information displayed by a display means, and video device can be utilized as the display means. Although the capturing game may as described above be led for example by teachers at a kindergarten giving out instructions, putting such game progress information on video and playing it back and showing it on a display lets the relevant game be conducted by transmitting the game progress information to the players. Then for example by having actors dressed up as various characters give a performance according to a story that leads the game, and by taping it, when the game is led by playing the video recording, the youngsters who are the players get drawn in by the characters and become engrossed in playing the game, which along with increasing the fun of the game itself enables improving the effectiveness with which knowledge is thereby acquired. Further, if given play apparatuses amount to a large number, although having performers dressed up as the characters give on-site performances would be problematic to put into practice, utilizing video for the large number of play apparatuses makes it readily feasible to conduct the game by means of performances in which the same characters act.

The foregoing display means may also be arranged by providing a number of information-displaying cards on which game progress information is indicated, so that the game progress information is given in a sequential display by showing the information-displaying cards in turn. A picture-card drama put on by kindergarten teachers is appropriate as such a display means. Through such a picture-card drama also, the aforementioned game may be led according to a story in which characters are made to appear, demonstrating the same effects as noted above.

BRIEF DESCRIPTION OF DRAWINGS

FIGS. 3 and 4 are explanatory diagrams showing examples of educational information portrayed on gas globes;

DETAILED DESCRIPTION

Figure 1:
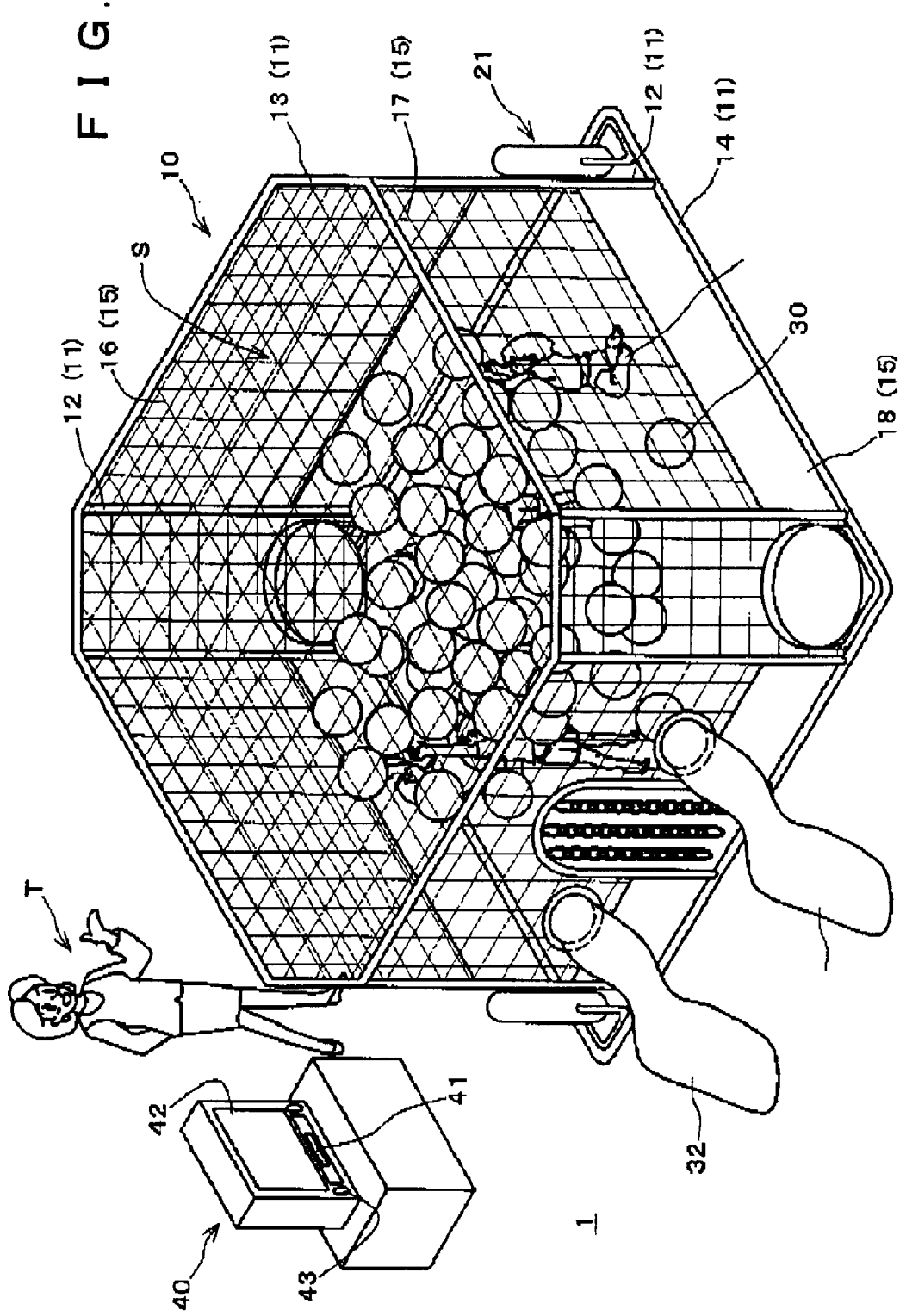
FIG. 1 is an oblique view representing an educational play system overall in a preferred mode having to do with the present invention.

Based on the appended drawings concrete embodiments of the present invention will be explained in the following. As indicated in FIG. 1, an educational play system 1 in the present example is made up of an educational play apparatus (simply "play apparatus" hereinafter) 10 set onto a suitable floor or the ground, and a video device 40 that is a display means that displays game progress information.

Play Apparatus

Figure 2:
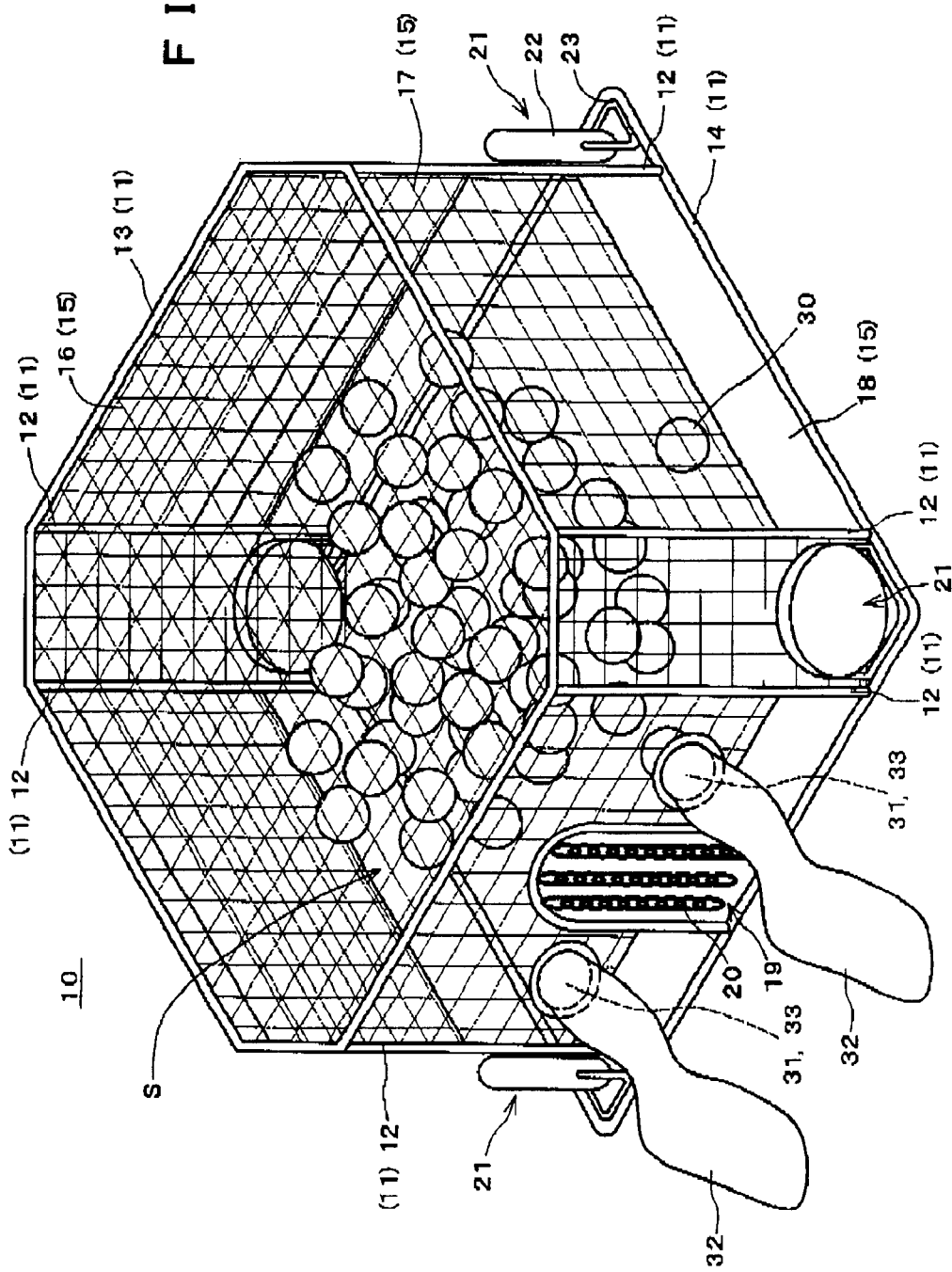
FIG. 2 is an oblique view showing overall an educational apparatus therefor.

As illustrated in FIG. 2, the play apparatus 10 is composed of a framework 11 made up of post members 12, a beam member 13 and a bottom edge member 14; a sheet-like screen-off member 15 hookingly attached to the framework, forming a predetermined play space S; gas globes 30 housed in the play space S; and electric fans 21 arranged along the hem portion of the play space S.

The post members 12, the beam member 13 and the bottom edge member 14 are each made constructs in which thin-walled pipe made of iron is a core material and urethane foam wrap-fitted around all areas of the core material, and meanwhile the outer periphery of the urethane sponge is covered with vinyl sheeting. The beam 13 is formed octagonally seen in plan view from four lengths each of long-edge portions and short-edge portions, constituting the upper rim of the play space S. Then at the lower end of each corner portion the post members 12 are worked into joints, and at the same time the lower-end portion of the post members 12 are joined to the bottom edge member 14, which is rectangular seen in plan view, making the framework 11 in its entirety a skeleton that consists of the edge portions of an approximate octahedron. Here, constituting the core material forming the framework 11, if permissible cost-wise, from pipe made of aluminum can serve to lighten the weight; and constituting it, if permissible strength-wise, from pipe made of vinyl chloride can also serve to lighten the weight.

The screen-off member 15 is made up of a ceiling member 16 that screens off the upper side of the play space S, a lateral member 17 that screens off its lateral sides, and hem members 18 that are furnished along the hem area of the play space S. The ceiling member 16 and the lateral member 17 are together made from a net-like component formed from synthetic-fiber monofilaments, and provide ventilation. Further, the hem members 18 are furnished only along the hem areas of the long-edge side surfaces among the lateral surfaces of the play space S, and consists of non-ventilating vinyl sheeting. Here the lateral member 17 may be arranged unitarily therewith; and its sides may be separate cuts. Likewise, the hem members 18 may be arranged such that they are patched together with the lateral member 17; and may be such that the hem members 18 are joined to the bottom of the lateral member 17 by stitching.

Then via hooking-attachment means such as the surface fastener commonly referred to by the trademark Velcro, the ceiling member 16, the lateral member 17 and the hem members 18 are hookingly attached respectively onto the aforementioned post members 12, beam member 13, and bottom edge member 14, forming the octahedral play space S. Here, other than the surface fastener noted above, slide fasteners commonly referred to as zippers may be utilized for the fastening means.

Further, although not particularly indicated in the figures, a mat made from urethane foam is laid out onto the floor or ground that the bottom edge member 14 encompasses, and a cover sheet is spread over the mat. Then via the just-noted surface fastener the peripheral margin of the cover sheet is fixed by hookingly attaching it to the lower-edge inner surface of the lateral member 17.

Further, a portal 19 for players Y to enter/exit is provided in the lateral member 17, and the rim thereof is cordoned by a taping material. Then chains 20 formed from plastic are made to suspend from the portal 19. Here, hookingly attaching via a surface fastener an arch-shaped gatepost formed from urethane foam and vinyl sheeting to the rim portion of the portal 19 can heighten the decorativeness.

The fans 21 are furnished with blades that produce airflow, electrically powered motors that drive the blades, covers 22 that cover the blades, and leg portions 23 that support the covers 22; they are disposed along the outside hem portion of the play space S respectively opposing the lateral member 17 where it constitutes the short-edged lateral sides of the space S. Further, the leg portions 23 are formed into a shape that seats them into the inside of the corner areas formed by the bottom edge member 14.

Further, bag-shaped housing members 32 provided with openings 33 large enough to let the gas globes 30 pass through are respectively arranged on either side of the portal 19. The housing members 32 are hookingly attached along their outer side via the fastener noted above to openings 31, likewise large enough to let the gas globes 30 pass through, formed in the lateral member 17, which enables stowing the gas globes 30 into the housing members 32 from within the play space S.

The gas globes 30 housed within the play space S are for example rubber balloons, paper balloons or else vinyl sheet formed into bag shapes, into which pressurized gas is charged to inflate them, and are constituted with what will enable them to waft in the air to a certain extent; their contour is not limited to being globular, and they may be lent all sorts of contours, such as stellate, rhombic, and cubic. Then educational information is portrayed on the surface of the gas globes 30 by means such as printing. Educational information here means information chiefly required for preschool and primary education, and as examples thereof, represented on a symmetrical pair of faces of the balloons, is exemplified in FIGS. 3 and 4.

Illustrated in FIG. 3(a) is an example in which numerals and a number of marks corresponding thereto are represented on each face of the balloons; in (b) of the same figure is an example in which Japanese hiragana syllabary characters and Japanese katakana syllabary characters corresponding thereto are represented on each face of the balloons; and in (c) of the same figure is an example in which upper-case letters of the alphabet and, corresponding thereto, lower-case letters of the alphabet and their Japanese katakana readings are represented on each face of the balloons. Likewise, illustrated in FIG. 4(a) is an example in which Japanese hiragana expressing shapes such as a circle and a square, and contour patterns corresponding thereto, are represented on each face of the balloons; in (b) of the same figure is an example in which Japanese hiragana expressing things such as a car and a train, and figures corresponding thereto, are represented on each face of the balloons; in (c) of the same figure is an example in which Japanese hiragana and katakana expressing the color of a given balloon are represented on each face of that balloon; and in (d) of the same figure is an example in which clock figures indicating times and numeric displays of the times are represented on each face of the balloons.

Here, while it stands to reason that the educational information expressed on the gas globes 30 is not limited to the above, the faces on which it is expressed are not limited to being a pair as in the examples above, and nothing would prevent there being one face or three or more faces.

Accordingly, as determined by the play apparatus 10 set up with the foregoing configuration, airflow produced by the fans 21 passes the lateral member 17 forward thereof, proceeds into the play space 5, collides with the play space S floor in the vicinity of its central part, and for the most part becomes a perpendicularly directed ascending airflow. The gas globes 30 accommodated within the play space S are jumbled by the air streams and ascending airflow thus from the fans 21, and float and flutter about. Players Y can then enjoy a variety of games within the space where the gas globes are in this way floating and fluttering about. For example, because the gas globes 30 shield visual range, tag games and maze-like games can be enjoyed; moreover, a game of capturing the floating gas globes 30 can be enjoyed.

Then if a capturing game is to take place, it may be played utilizing educational information portrayed on the gas globes 30, and a given capturing game can be led by, for example, a kindergarten teacher T giving out instructions.

Specifically, for example, the teacher T may give out the instruction "Please get a balloon for the number 1," or "Please get an airplane balloon," to let the players Y have fun at capturing the indicated balloons from among the many there are: balloon(s) on which the numeral "1" is represented, balloon(s) on which a single mark is portrayed, balloon (s) on which an airplane figure is represented, and balloon(s) on which the characters "ひこうき" (Japanese signifying airplane) are written.

In this way, by playing games capturing gas globes 30 on which educational information is portrayed, the players Y come into contact spontaneously with the educational information, reinforcing information given them up to that point through care workers; or by seeing the figure of an airplane simultaneously with the text "ひこうき" (Japanese signifying airplane) they learn letters naturally, such that they come to comprehend the significance of the letters. Further, playing games that get the four limbs moving serves to stimulate the brain, and acquiring information in such a state serves to improve knowledge and scholastic ability; likewise, implementing instruction while they are playing lets the players Y learn while their interest is held and they enjoy themselves, and improves the effectiveness with which the learning is acquired. Then by giving praise to players Y who have captured a correct balloon, they will feel a sense of distinction and satisfaction, such that the players Y will play the game in further earnest, which serves still more to improve the acquirement effectiveness. Further, the capturing game may be one in which the players Y are organized into teams made of a number of persons, and that has them work together and make commitments as a team to store captured gas globes 30 in the housing members 32 and has them contend for how fast they do so, as in a ball-collecting ("tama-ire") game. When this sort of game is played, commitments to and relationships with others are recognized by the players Y, enabling practicein striving to make one's intentions understood, as well as fostering cooperativeness. Here the housing members 32 may be composed of netting or sheet material. Likewise, utilizing a zipper and forming them into a bag shape makes it possible to take out at one time the gas globes 30 stored inside by opening the zipper, which is efficient. Further, when the housing members are not being used, it is preferable that the openings 31 be blocked off using netting or sheet material.

Video Device

The forgoing capturing game may also be led by means of the video device 40. The video device 40 is composed of a playback unit 41 that from information recorded on, e.g. videotape, generates a playback signal with the relevant video and audio; a display 42 that displays images based on the playback signal; and speakers 43 that generate sound based on the playback signal.

Although the foregoing capturing game may, as described above, be conducted for example by a kindergarten teacher T giving out instructions, putting such game progress information on video and playing it back to show it on the display 42 and to output sound through the speakers 43 lets the relevant game be conducted by transmitting play progress information to the players Y. Then for example by having actors dressed up as various characters give a performance according to a story that leads the game, and by videotaping it, when the game is led by playing the video recording, the youngsters who are the players Y get drawn in by the appearing characters themselves and the performance in which the characters are acting, and become engrossed in playing the game, which along with increasing the fun of the game itself enables improving the effectiveness with which knowledge is thereby acquired. Further, if given play apparatuses 10 amount to a large number, although having performers dressed up as the characters give on-site performances would be problematic to put into practice, utilizing video for the large number of play apparatuses 10 makes it readily feasible to conduct the game by means of performances in which the same characters act.

As determined by the educational play system 1 in the present example, because preschool and primary instruction may be carried out while playing games, the players Y may learn while they enjoy themselves and the effectiveness with which the learning is acquired may be improved; at the same time practice in striving to make one's intentions understood is made possible, as is fostering cooperativeness.

Although one specific embodiment of the present invention was explained in the foregoing, it goes without saying that the modes that the present invention can assume are not thereby limited; for example, the play apparatus 10 is not limited to the configuration in the above instance, and may have the configurations indicated in FIGS. 5 through 8.

Figure 5:
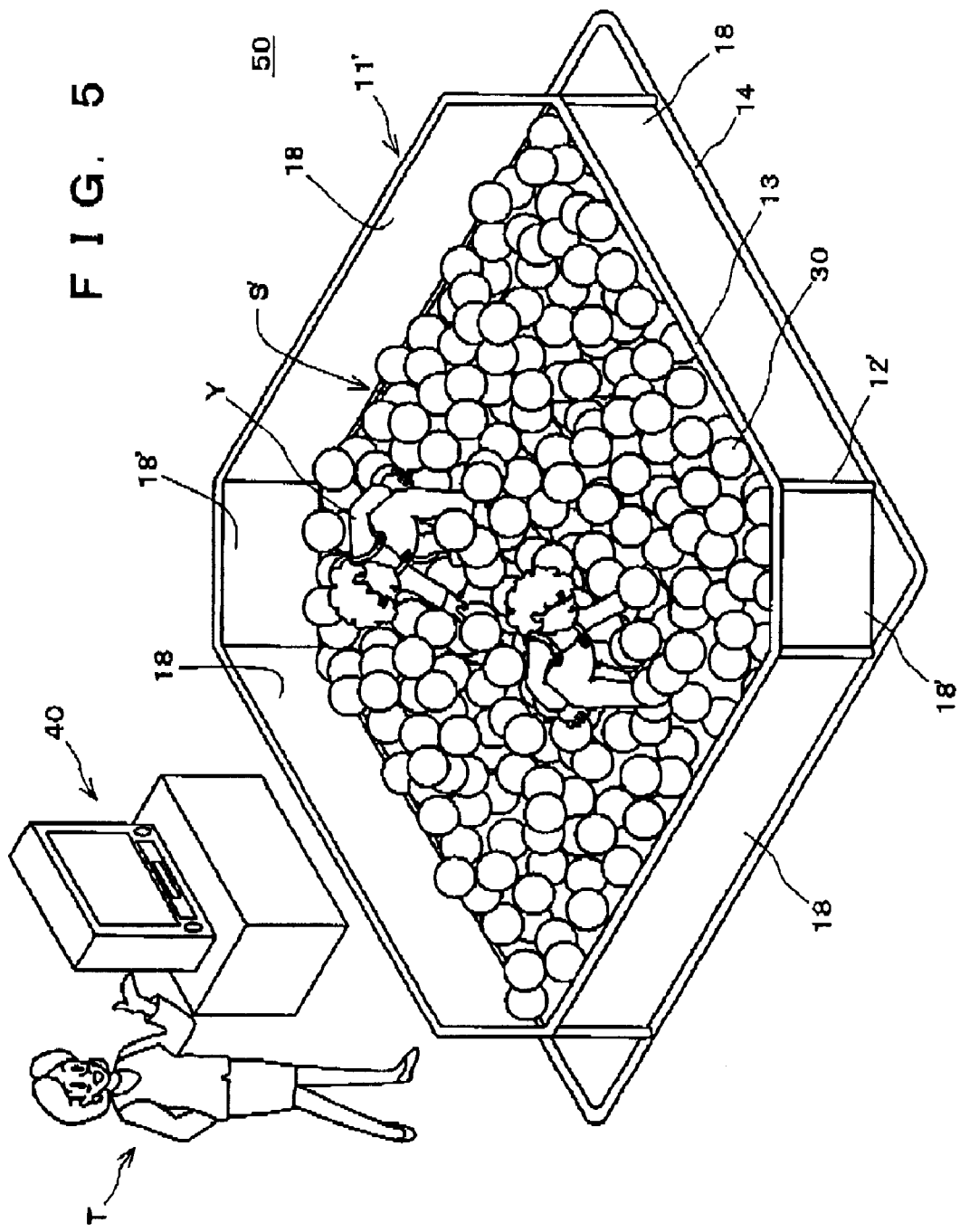
FIG. 5 is an oblique view representing overall a different preferred educational play apparatus under the present invention.

Namely, a play apparatus 50 that is represented in FIG. 5 is what is commonly referred to as a ball pool; therein a framework 11' is formed utilizing post members 12' shorter than the length of those in the above example and joining the beams 13 and the bottom edge member 14 to the post members 12'; meanwhile the hem members 18 and separately prepared hem members 18' are hookingly attached to the portions of the framework 11' that form its lateral sides, forming a play space S', with numerous gas globes 30 being housed within the play space S'. The gas globes consist of hollow balls formed from hard plastic or soft plastic, and on the surface thereof the aforementioned educational information is portrayed by printing or the like. By means of this play apparatus 50 also, as likewise with the play apparatus 10 of the above example, players Y can be made to play capturing games, which can yield successes in terms of education similar to those described above.

Figure 6:
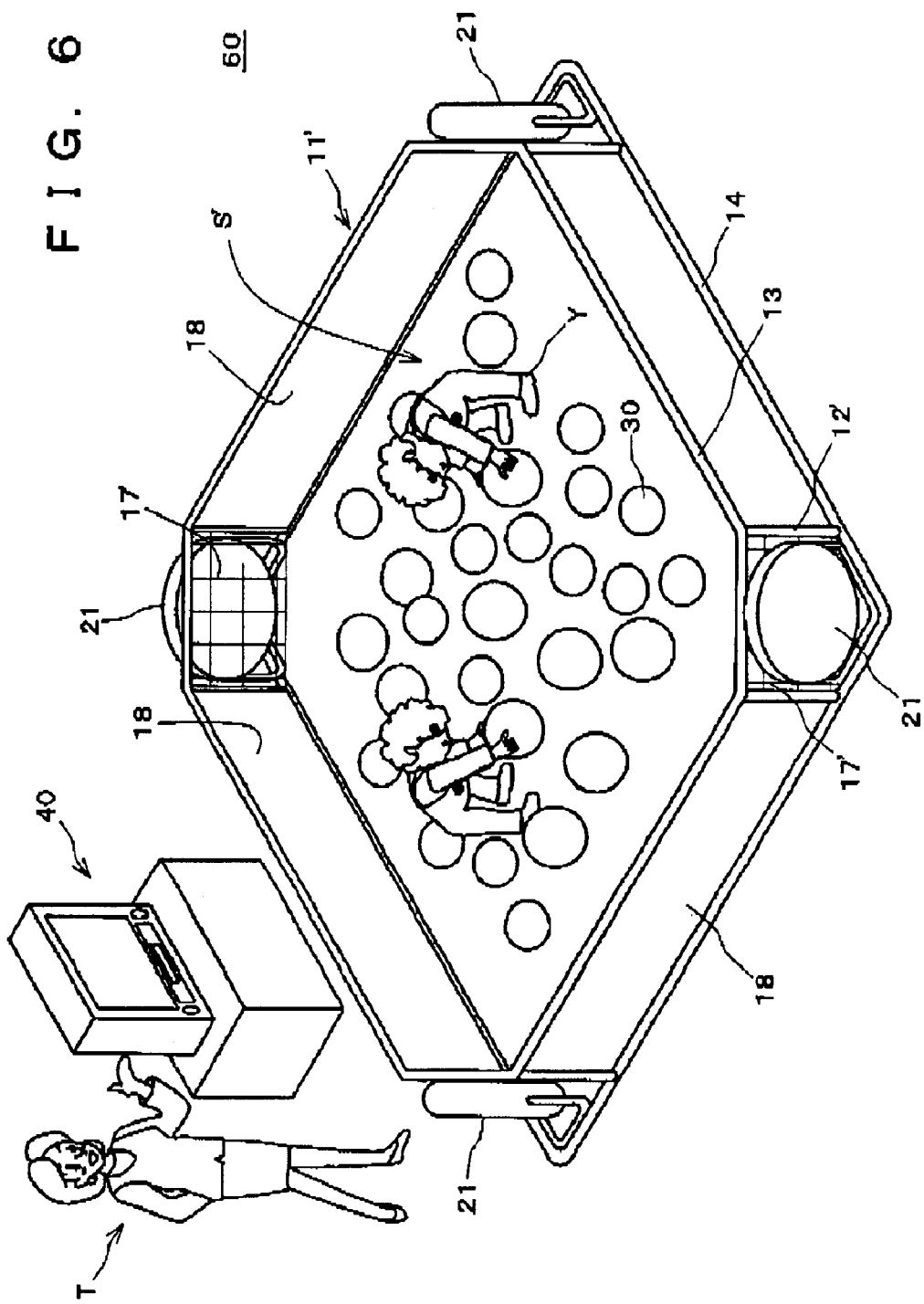
FIG. 6 is an oblique view representing overall a yet different preferred educational play apparatus under the present invention.

Further, a play apparatus 60 that is represented in FIG. 6 is configured by taking away the hem members 18' in the play apparatus 50 shown in FIG. 5, in place of the hem members 18' fitting in lateral members 17' of separately prepared netting, and in the same areas arranging the earlier-noted fans 21, and meanwhile, housing within the play space S low-buoyancy gas globes 30 such as beach-balls, and gas globes 30 consisting of hollow balls made from hard plastic or soft plastic. Here, the aforementioned educational information is portrayed on the surface of these gas globes 30 also, by printing or the like. By means of the play apparatus 60 having this configuration, the gas globes 30 are jumbled by the fan means 21 such that they move levelly but irregularly on the floor, and in this way the players Y can be made to play the above-mentioned capturing games within the play space S where the gas globes 30 travel levelly but irregularly on the floor. In this manner, by means of this play apparatus 60 also, successes in terms of education as likewise with the play apparatus 10 of the above example can be gained.

Figure 7:
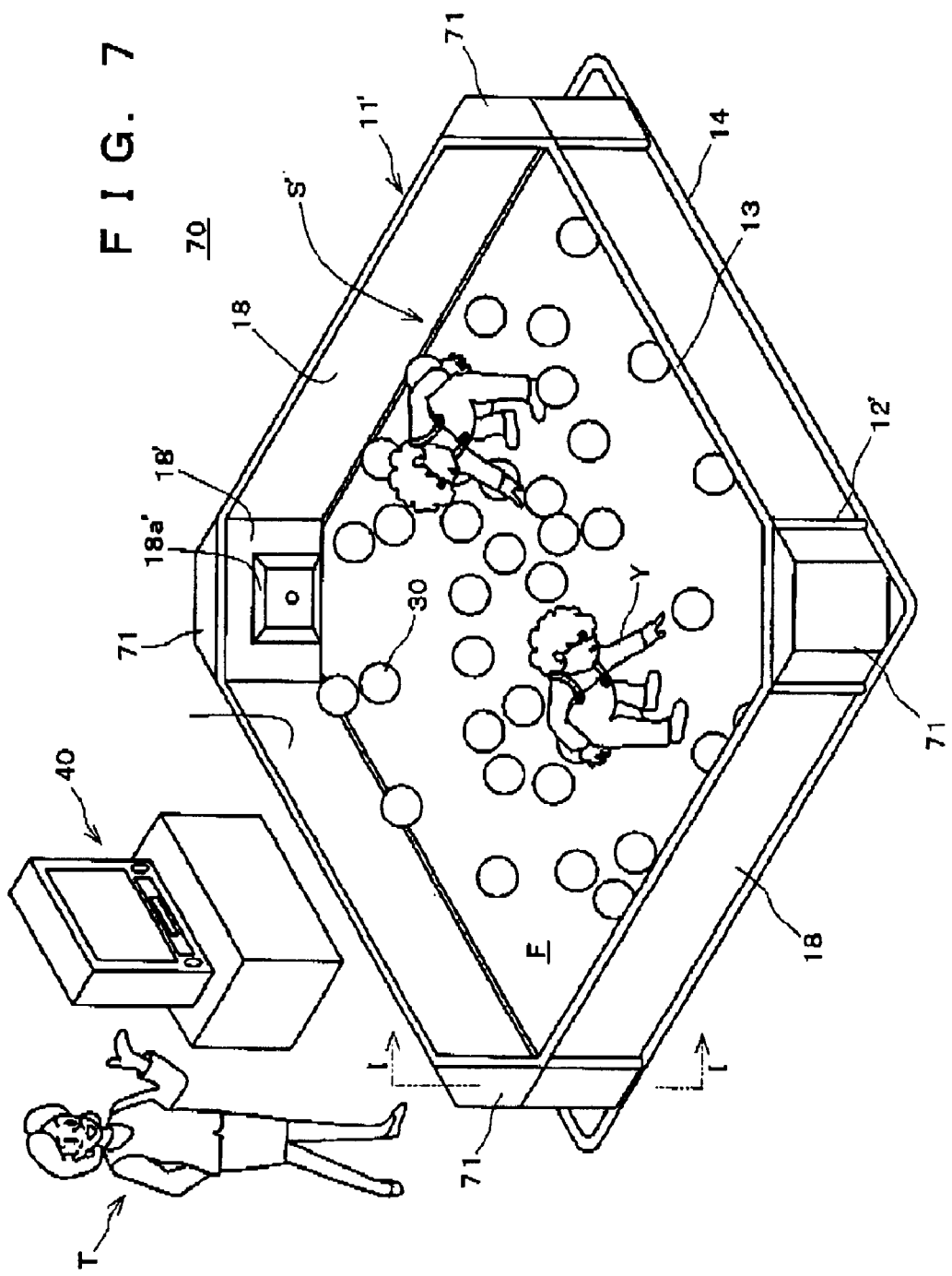
FIG. 7 is an oblique view representing overall a still different preferred educational play apparatus under the present invention.

Further, a play apparatus 70 that is represented in FIG. 7 is lent a configuration in which air blowers 71 are provided in the configuration of the play apparatus 50 shown in FIG. 5, and houses within the play space S low-buoyancy gas globes 30 such as beach-balls, on which the aforementioned educational information is portrayed, and gas globes 30 consisting of hollow balls made from hard plastic or soft plastic. The floor F within the play space S' is formed into a sloping surface that is highest in the central portion and thereabouts, and that is lowest in the corners, where the hem members 18' are installed, and thereabouts, which makes the gas globes 30 housed within the play space 5' roll toward the corner areas, such that they gather there. Here, openings 18a' are formed in the hem members 18'.

Figure 8:
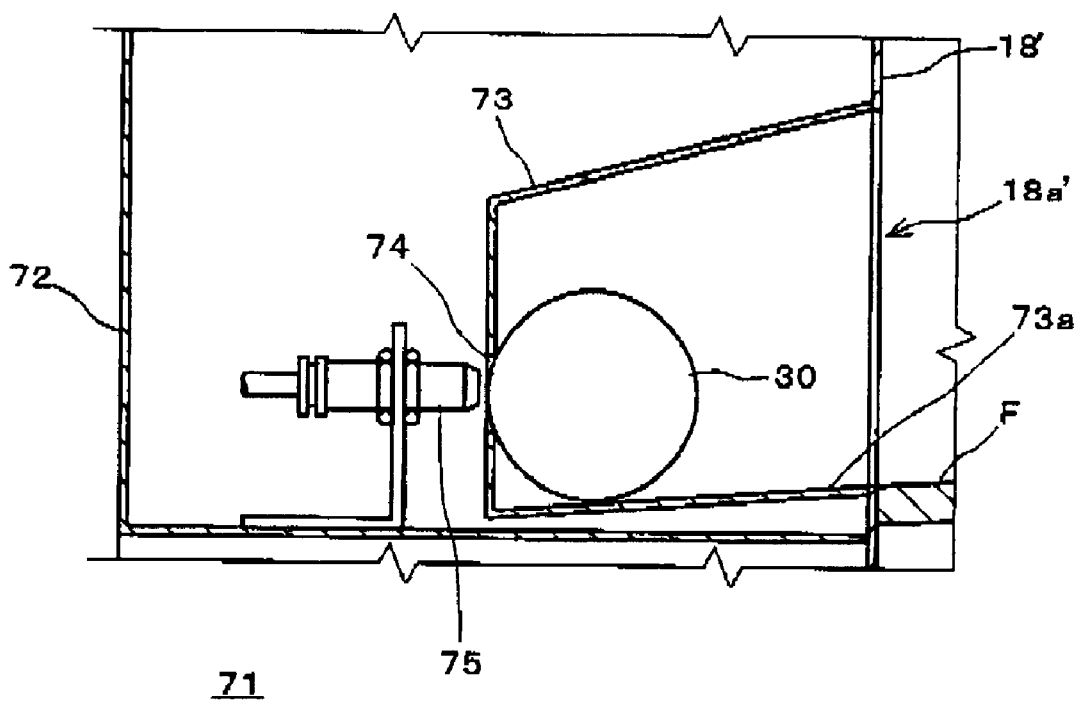
FIG. 8 is a sectional view in the direction of indicating arrows I—I in FIG. 7.

The air blowers 71, which correspond to each hem member 18', are respectively disposed on the outside thereof, and are installed such that they are connected with the openings 18a' formed in the hem members 18'. FIG. 8 is a diagram of a section along the direction of the view pointers I—I in FIG. 7, and as indicated in the figure, the air blowers 71 are connected to the openings 18a', and are composed of: a receptacle 73 for taking in through the opening 18a' gas globes 30 that gather there; a nozzle 75, disposed rearward of the receptacle 73 and fronting on a through-hole 74, provided in the backside thereof; a sensor (not illustrated) that detects gas globes 30 that have been received into the receptacle 73; a pressurized air supply source that supplies pressurized air to the nozzle 75; and a case 72 that houses the receptacle 73, the nozzle 75, (not illustrated) sensor, etc. Here, the bottom surface 73a of the receptacle 73 is established so that it is continuous with the floor surface F.

With this play apparatus 70 the gas globes 30 housed within the play space S' roll toward each opening 18a' due to the slope formed in the floor surface F, and through the openings 18a' are lodged by the receptacles 73. When a gas globe 30 is contained in a receptacle 73, this is detected by the (not illustrated) sensor, the detection is received and pressurized air is ejected from the nozzle 75, and the gas globe 30 is blown out by the ejected pressured air toward the central portion of the floor F. Thus, by means of this play apparatus 70 the capturing game can be played in the midst of gas globes 30 that travel rolling on the floor surface F, and that are blown out by the pressurized air; and through this play apparatus 70 also, successes in terms of education as likewise with the play apparatus 10 of the above example can be gained.

Further, educational information may be portrayed on the gas globes 30 by representing it directly on them by printing; however, the educational information may be displayed on the gas globes 30 indirectly by utilizing a film on which the educational information is represented and cover-wrapping it onto the gas globes 30. While on the one hand with some gas globes 30, such as for example balls made of hard plastic or soft plastic, printing onto their surfaces is difficult to implement or otherwise the printing costs are expensive, printing onto films, which is relatively simple and low cost, will do. Accordingly, simple, low-cost portrayal of educational information can be carried out in the manner noted above.

Thus if the gas globes 30 are to be formed by inflating, through the sealed introduction of pressurized air, as with rubber balloons, the film can be made to cover-wrap a rubber balloon by constituting the film from a material lent extensibility and forming it into bag-like or tubular shapes, and, after inserting the rubber balloon into the film thus formed bag-like or tubular, by the sealed introduction of pressurized air therein to get the rubber balloon to inflate together with the film.

Likewise, it the gas globes 30 are formed from hard plastic to have good shape retentiveness, the film may be constituted from a material lent heat-shrinking properties and it may be formed into a bag-like or tubular form; and the film may be cover-wrapped onto a gas globe 30 by inserting the gas globe 30 into the film thus formed bag-like or tubular and thereafter subjecting it to a heating process to get the film to shrink.

Further, educational information portrayal may be displaying it on a gas globe 30 by sticking onto the gas globe 30 a thin film material (e.g., a sticker or the like) on one side of which an adhesive such as a bonding agent is spread and on the opposite side of which educational information is represented. Representing educational information on the thin film may be by printing, and for letters/characters and shapes may be by punching out their contours.

Further, the display means being the earlier noted video device 40 is not thereby limited, and may be constituted for example, by providing a number of information-displaying cards, as in picture-card drama, on which game progress information is indicated, such that the game progress information is put across by a teacher T giving out the instructions while sequentially drawing out card after card. In this way, the aforementioned game may be led according to a story in which characters are made to appear, demonstrating the same effects as with the game system 1 shown in FIG. 1.

What is claimed is:

1. An educational play system comprising:
   a screened-off compartment defining a play space;
   a plurality of gas globes, superficially on each of which educational information is visually portrayed, housed in the play space, said gas globes being at least one selected from the group consisting of rubber balloons, paper balloons, rubber balls, gas globes produced by inflating elastic bags, gas globes produced by forming hollow balls from soft plastic, and gas globes produced by forming hollow balls from bard plastic;
   means for enabling players in games to play at capturing gas globes within the play space; and
   means for leading the capturing game by displaying game progress information.

2. The educational play system set forth in claim 1, wherein said means for enabling players to play at capturing gas globes includes housing means for housing gas globes that players have captured.

3. The educational play system set forth in claim 1, wherein the gas globes are cover-wrapped with film, and the educational information is portrayed on the film.

4. The educational play system set forth in claim 3, wherein the gas globes are formed by inflating, through seated introduction of a pressurized fluid, bags made from a gastight elastic material, and the film is composed of a material having extensibility and is formed into bag-like or tubular shapes, for cover-wrapping the gas globes with the film by inserting the gastight elastic bags into the film having been formed into bag-like or tubular shapes, and sealingly introducing a pressurized fluid therein to get tine bag to inflate together with the film.

5. The educational play system set forth in claim 3, wherein the gas globes are formed from a hard plastic, and the film is composed from a material lent heat-shrinking properties and is formed into bag-like or tubular shapes, for cover-wrapping the gas globes with the film by inserting the gas globes into the film having been formed into bag-like or tubular shapes, and subjecting them to a heating process to get the film to shrink.

6. The educational play system set forth in claim 1, wherein a thin film material on one side of which an adhesive is spread and on the opposite side of which educational information is represented is pasted onto the gas globes.

7. The educational play system set forth in claim 1, wherein the educational information portrayed on each gas globe is rendered so as to be at least one item from at least one set interrelated by symbolic association.

8. The educational play system set forth in claim 1, wherein said means for leading the capturing game is a video device.

9. The educational play system set forth in claim 1, wherein said means for leading the capturing game is established by providing a number of information-displaying cards on which the game progress information is indicated, such that the game progress information is presented by sequentially drawing out the information-displaying cards card after card.

10. An educational play system comprising:

a screened-off compartment defining a play space;

a plurality of gas globes housed in the play space, each of said gas globes being superficially sectioned into a number of display regions in each of which educational information is visually portrayed, and said gas globes being at least one selected from the group consisting of rubber balloons, paper balloons, rubber bails, gas globes produced by inflating elastic bags, gas globes produced by forming hollow balls from soft plastic, and gas globes produced by forming hollow balls from hard plastic;

means for enabling players in games to play at capturing gas globes within the play space; and means for leading the capturing game by displaying game progress information.

11. The educational play system set forth in claim 10, wherein the educational information portrayed in each of the display regions is rendered so as to be at least one item from at least one set interrelated by symbolic association.

12. An educational play system comprising:

a screened-off compartment defining a play space;

a plurality of gas globes cover-wrapped with film superficially on which educational information is visually portrayed, housed in the play space, said gas globes being at least one selected from the group consisting of rubber balloons, paper balloons, rubber balls, gas globes produced by inflating elastic bags, gas globes produced by forming hollow balls from soft plastic, and gas globes produced by forming hollow balls from hard plastic;

means for enabling players in games to play at capturing gas globes within the play space; and means for leading the capturing game by displaying game progress information.

13. The educational play system set forth in claim 12, wherein the educational information portrayed in each of the display regions is rendered so as to be at least one item from at least one set interrelated by symbolic association.

* * * * *